United States Patent Office 3,281,319
Patented Oct. 25, 1966

3,281,319
PEST CONTROL COMPOSITIONS
James E. Potts, Millington, N.J., and Andrew J. Borash, Raleigh, N.C., assignors to Union Carbide Corporation, a corporation of New York
No Drawing. Filed July 23, 1965, Ser. No. 474,451
22 Claims. (Cl. 167—42)

This invention relates to pest and growth control compositions, and more particularly to such compositions having enhanced or prolonged effectiveness when applied to surfaces such as plant surfaces, screens, glass and the like.

It is common practice to apply pest controlling compositions to surfaces such as plant leaves and branches to control various noxious organisms, or to control the growth of the plant. A large proportion of such applications is made in the form of sprays in which the toxicant or control agent is combined with other adjuvants and water, in the form of emulsions or dispersions, usually containing surface active agents.

Such control compositions, while effective when initially sprayed, are often washed off by rainfall, or are otherwise removed from the surface to be protected, so that their effectiveness is often short lived. Such conditions require repeated application of control composition to obtain satisfactory pest or growth control, involving additional labor, expense and sometimes injury to the host plants.

Many attempts have been made in the past to produce improved pest control compositions which would provide prolonged effect on the pests, or plants, and specifically, which would resist weathering and continue to give protection or growth control to the plant or protection to other exposed surfaces after heavy rainfalls.

Many so-called "stickers" have been developed for addition to pest control sprays, and a number of such stickers are commercially available and are effective to greater or lesser degrees in improving the adherence of the control composition to the surface to be treated. Because of the combination of properties required in such "sticking agents," however, most such agents are unsatisfactory in one or more respects. Thus, the sticking agent must be inert toward, and non-reactive with, the pest control component; it must de dispersible in, and compatible with, the pest control compositions to give a stable, sprayable, aqueous formulation. On the other hand, its adhesive properties with respect to both the plant and pest control agent must be such that, while acting as a sticker, it does not interfere with the "breathing" of the plant, nor with the toxic or regulant action of the pest control agent, which, in many cases, is by direct contact with the pest organism or with the plant parts, and while the sticking agent must be soluble or emulsifiable in the aqueous spray composition, it must be resistant to water, in the form of rain, after application.

One such "sticker" that has been proposed is an emulsifiable oxidized polyethylene wax. The oxidation of polyethylene, however, is a random reaction that produces a variety of products that are usually undesirably colored and have objectionable odors. Thus oxidized polyethylene wax is not ideally suited as a "sticking agent."

It has now been found that pest and growth control spray compositions having enhanced and greatly prolonged periods of activity and increased resistance to weathering, particularly to the action of rain, are obtained according to this invention by incorporating into a pesticidal spray composition prior to its application to the surface to be protected an emulsifiable polyolefin wax adduct having an average of at least about one-half of an olefinic double bond per polymer molecule, a molecular weight of about 1000 to about 5000, and at least about 25 percent of said olefinic double bonds adducted with an organic compound capable of entering into an addition reaction with an olefinic double bond.

An important feature of this invention is the fact that polyolefin wax adducts can be employed with all types of sprayable pest control compositions, applied as dispersions of wettable spray powders or of emulsifiable concentrates, and meets the stringent requirements of an effective sticker mentioned above, and the requirements of emulsifiability before application and resistance to removal by rain after deposit on the surface to be protected. Moreover, the emulsifiable polyolefin wax adduct-containing spray compositions include formulations employing all types of pest control toxicants whether insecticides, miticides, fungicides, or herbicides and also is effective with beneficial plant growth regulants, such as the maleic hydrazide compositions. Thus, wherever the term pest control compositions is used herein, it should be understood to include all the foregoing.

The term "polyolefin" is used herein to denote normally solid homopolymers of alpha monoolefinically unsaturated hydrocarbons as well as normally solid copolymers thereof. Suitable polyolefins include polyethylene, polypropylene, polyethylene-polypropylene copolymers and the like. Polyolefin waxes useful in this invention have an average of at least one-half, and preferably one, olefinic double bond per polymer molecule and a molecular weight of from about 1000 to about 5000. Polyolefin waxes typically contain at least one type of olefinic double bond and sometimes a combination of two or three different types of double bonds. A polyolefin wax molecule containing an olefinic double bond can be represented by the formula $RR_1C{=}CHR_2$ wherein R is an alkyl group and $R_1$ and $R_2$ each are hydrogen or an alkyl group. Where $R_1$ and $R_2$ are both hydrogen, the bond is termed a terminal vinyl type of double bond. Where $R_2$ is hydrogen and $R_1$ is an alkyl group, the bond is termed a vinylidene type of double bond and where $R_1$ is hydrogen and $R_2$ is an alkyl group, the bond is termed an internal type of double bond. All of these types of olefinic double bonds are capable of entering into an addition reaction with organic compounds of the class described herein.

Polyolefin waxes can be prepared by the pyrolysis or thermal degradation of higher molecular weight polyolefin polymers or by the direct polymerization of an olefin monomer or monomers to a wax of desired molecular weight. Pyrolysis, for example, can be carried out in a heated pyrolysis tube at about 450° to 600° C. Linear, high density polyethylene waxes having a density of 0.94 and above are preferred. Polyethylene waxes having lower densities, as well as other polyolefin waxes can also be employed.

Emulsifiable polyolefin wax adducts useful in this invention are prepared by adducting at least about 25 percent, preferably about 50 percent, of the olefinic double bonds in the polyolefin wax with an organic compound capable of entering into an addition reaction with an olefinic double bond. Organic compounds possessing this capability are carboxylic acids of the class described herein and alkyl phospites having at least one hydrogen atom capable of entering into an addition reaction with an olefinic double bond.

Suitable carboxylic acids that can be reacted with polyolefin waxes to form an adduct thereof include (1) alpha-unsaturated monocarboxylic acids having from 3 to 6 carbon atoms, as for example, acrylic acid, crotonic acid, sorbic acid, and the like, (2) alpha-unsaturated dicarboxylic acids having from 4 to 10 carbon atoms, as for example, maleic acid, tetrahydrophthalic acid, fumaric acid, glutaconic acid, itaconic acid and the like, (3) mercapto carboxylic acids having from 2 to 10 carbon atoms, as for example, 2-mercapto acetic acid (commonly called thioglycolic acid), 3-mercapto propionic acid, 4-mercapto adipic acid, 2-mercapto succinic acid, 2-mercapto adipic acid and the like, (4) anhydrides of the foregoing acids, for example maleic anhydride and the like, and (5) esters of the foregoing acids, for example, the ethyl ester of thioglycolic acid and the like. All of the foregoing carboxylic acids are capable of entering into an addition reaction with an olefinic double bond.

Suitable alkyl phosphites that can be reacted with polyolefin waxes to form an adduct thereof can be represented by the formula

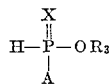

wherein X represents an oxygen or a sulfur atom, $R_3$ is an alkyl group having from 1 to 16 carbon atoms and A is hydrogen or —$OR_4$ wherein $R_4$ is an alkyl group having from 1 to 16 carbon atoms. Thus as used herein, the term "phosphite" refers to both phosphites and thiophosphites. It should be understood that when A is —$OR_4$, $R_3$ and $R_4$ can be the same or different alkyl groups. Suitable alkyl phosphites include methyl dihydrogen phosphite, ethyl dihydrogen phosphite, n-butyl dihydrogen phosphite, n-heptyl dihydrogen phosphite, n-hexadecyl dihydrogen phosphite, dimethyl hydrogen phosphite, diethyl hydrogen phosphite, dipropyl hydrogen phosphite, di-n-butyl hydrogen phosphite, di-n-octyl hydrogen phosphite, di-n-pentadecyl hydrogen phosphite, methyl ethyl hydrogen phosphite, ethyl-n-decyl hydrogen phosphite, methyl dihydrogen thiophosphite, ethyl dihydrogen thiophosphite, n-undecyl dihydrogen thiophosphite, dimethyl hydrogen thiophosphite, diethyl hydrogen thiophosphite, di-n-butyl hydrogen thiophosphite, di-n-heptyl hydrogen thiophosphite, di-n-hexadecyl hydrogen thiophosphite and the like. Inasmuch as the alkyl thiophosphites produce a modified polyolefin wax having a typical mercaptan odor, and the alkyl dihydrogen phosphites can under certain conditions lead to crosslinking, the dialkyl hydrogen phosphites are preferred for purposes of this invention. These preferred phosphites have the formula

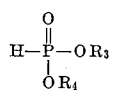

wherein $R_3$ and $R_4$ are as defined above. It should be noted that trialkyl phosphites are not suitable reactants in this invention because they do not have a hydrogen atom available to enter into a free radical addition reaction with the olefinic double bond present in polyolefin waxes. For a detailed discussion of the mechanism of the free radical addition reaction between alkyl phosphites of the class described herein and the olefinic double bond, reference is made to Stacey et al., Organic Reactions, 13, 218–225, John Wiley and Sons, Inc., New York (1963).

The polyolefin wax adducts described herein can be prepared by blending the polyolefin wax and a carboxylic acid or alkyl phosphite, hereinafter termed "organic compound," in the liquid phase, for example in the melt or in solution, and reacting them in the presence of an addition reaction initiator with agitation at a temperature of from about 130° C. to about 200° C., preferably from about 150° C. to about 190° C. Blending and agitation can be carried out in any manner which insures intimate admixing of the reactants and good heat transfer throughout the reaction mass during the reaction time.

If the addition reaction is conducted in solution, the reaction medium should be a liquid organic solvent inert with respect to the reactants under the reaction conditions and which is a solvent for the polyolefin wax and organic compound. Suitable solvents include benzene, toluene, xylene, cyclohexane, methylcyclohexane, iso-octane, and the like, and halogenated hydrocarbon solvents such as chlorobenzene, ortho - dichlorobenzene, 1,1,2 - trichloroethane, bromobenzene, α - chloronaphthalene and the like. It is preferred to use only as much solvent as will completely dissolve the polyolefin wax and organic compound.

It is preferred to conduct the addition reaction in the melt by heating the polyolefin wax to its melting point and above and blending in the organic compound.

Generally an excess over the amount of organic compound theoretically necessary to react with the olefinc double bonds present in the polyolefin wax molecules should be used in order to achieve good rates of reaction and to insure complete reaction. A high reaction rate is not necessarily the sole factor in determining the optimum amount of organic compound to be used. For example, it is only required that about 25 percent, preferably 50 percent, or above of the olefinic double bonds be adducted to provide an ultimately emulsifiable product. Thus, the use of more organic compound than is required is unnecessary except to reduce the time needed to conduct the addition reaction.

The addition reaction between the polyolefin wax and the organic compound can be initiated by organic peroxides, organic azo compounds, ultraviolet radiation, and X-radiation. Stacey et al., supra, p. 219. Suitable organic peroxide initiators or catalysts include di-t-butyl peroxide, 2,5 - dimethyl - 2,5 - di(t - butyl peroxy) hexyne-3, dicumyl peroxide, benzoyl peroxide, lauroyl peroxide, and the like. Suitable organic azo compounds include azonitriles such as azo - bis - butyronitrile and the like. In using ultraviolet radiation as the initiator, a photosensitizer such as benzophenone should be present.

The addition reaction between an olefinic double bond and a carboxylic acid anhydride, for instance maleic anhydride, and the alkenyl succinic anhydride formed can be shown as follows:

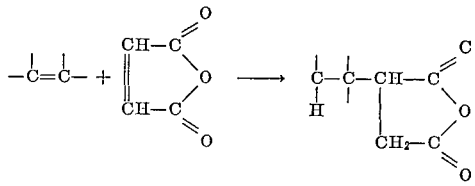

For a discussion of the mechanism of this addition reaction see Hill et al., JACS, 86, 965 (1964).

The addition reaction between an olefinic double bond and an alkyl phosphite, and the adduct formed can be shown as follows:

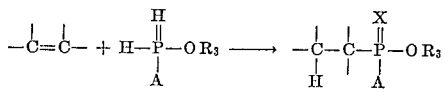

wherein A, $R_3$ and X are as defined previously. As indicated above the reactive olefinic double bond in the polyolefin wax molecule can be a terminal, vinylidene, or internal type of double bond. The addition product is termed a phosphonate ester of a polyolefin wax which as indicated above, includes thiophosphonate esters.

Polyolefin wax-alkyl phosphite adducts while emulsifiable under certain circumstances, can be rendered readily emulsifiable in one of two ways: (1) by converting at least about 25 percent, and preferably about 50 percent of the oxyalkyl groups attached to phosphorus atoms in the adduct to hydroxyl groups, for example

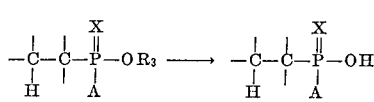

wherein A, R₃ and X are as defined previously, or (2) by reacting the phosphonate ester groups of the polyolefin waxalkyl phosphite adduct with an amine having at least one reaction amino hydrogen atom.

The conversion of the oxyalkyl groups in the polyolefin wax-alkyl phosphite adduct to hydroxyl groups can be accomplished by acid hydrolysis, base hydrolysis or pyrolysis, and the converted product can be termed a modified polyolefin wax-alkyl phosphite adduct.

Hydrolysis can be carried out in a solvent for the polyolefin wax-alkyl phosphite adduct or in the heated wax adduct itself. Acid hydrolysis can be accomplished using monovalent acids such as hydrochloric acid, chloroacetic acid, and the like. Polyvalent acids such as sulfuric acid, phosphoric acid, and the like can be used to hydrolyze but the salt by-products must be washed out before emulsification. Basic hydrolysis can be accomplished using bases such as alkyl metal hydroxide such as potassium hydroxide, sodium hydroxide, and the like and aqueous ammonia and the like. It should be understood that basic hydrolysis produces a salt which itself is readily emulsifiable. Thus as used herein the phrase "hydroxyl groups" is intended to include the salts thereof as well.

A preferred method for converting the oxyalkyl groups to hydroxy groups is by pyrolysis. Pyrolysis is carried out either in batch or continuously in suitable apparatus at a temperature of from about 280° C. to about 475° C. for a period of time sufficient to accomplish the aforementioned degree of conversion. It has been found that a methyl phosphite modified polyolefin wax will not undergo pyrolysis and this wax adduct must be hydrolyzed to convert the oxymethyl groups to hydroxyl groups. The pyrolysis method of conversion is preferred because it provides for a high conversion rate, uses low cost equipment, does not require a catalyst, and does not require an additional reagent as in hydrolysis thus eliminating blending problems. The by-product of the pyrolysis reaction is the alkene corresponding to the R₃ or R₄ alkyl group.

The reaction product of a polyolefin wax-alkyl phosphite adduct and an amine can be termed an amine modified polyolefin wax-alkyl phosphite adduct. Suitable amines can be represented by the formula

wherein $R_5$ represents a monovalent organic radical having from 1 to 12 carbon atoms, $R_6$ represents hydrogen or a monovalent organic radical having from 1 to 12 carbon atoms, and $R_5$ and $R_6$, when interconnected, represent a heterocyclic ring. The phrase "monovalent organic radical" refers to unsubstituted radicals as well as to substituted radicals. Exemplary of such monovalent radicals are the following: alkyl radicals, such as methyl, ethyl, n-propyl, n-butyl, n-hexyl, 2-ethyl-n-hexyl, n-octyl, n-dodecyl, and the like; cycloalkyl radicals, such as cyclohexyl and the like; unsaturated aliphatic and cycloaliphatic radicals, such as allyl, cyclopentenyl, and the like; halogenated alkyl and cycloalkyl radicals, such as chloroethyl, bromoethyl, fluoroethyl, 2-chloro-n-propyl, 2-bromo-n-propyl, 2-chloro-n-butyl, 3-chloro-n-amyl, 3-bromo-n-amyl, 2-chloro-n-hexyl, 2-chlorocyclohexyl, and the like; alkoxy and aryloxy substituted alkyl and cycloalkyl radicals, such as methoxymethyl, ethoxyethyl, 3-ethoxy-n-propyl, 4-ethoxy-n-butyl, 3-ethoxy-2-ethyl-n-hexyl, 2-methoxycyclohexyl, phenoxymethyl, 2-phenoxyethyl, 3-phenoxy-n-propyl, 2-phenoxycyclohexyl, and the like; hydroxy substituted alkyl and cycloalkyl radicals; tertiary amino substituted alkyl and cycloalkyl radicals; aralkyl radicals, such as benzyl, 2-phenylethyl, 3-phenyl-n-propyl, 1-phenyl-n-butyl, 1-phenyl-n-dodecyl, and the like; aryl radicals, such as phenyl, naphthyl, and the like; halogenated aryl radicals, such as p-chlorophenyl, p-bromophenyl, p-fluorophenyl, p-iodophenyl, 2-chloro- naphthyl, 2-bromonaphthyl, and the like; alkoxy and aryloxy substituted aryl radicals, such as p-methoxyphenyl, p-ethoxyphenyl, p-n-propoxyphenyl, and the like; hydroxy substituted aryl radicals; tertiary amino substituted aryl radicals; alkaryl radicals, such as o-methylphenyl, p-ethylphenyl, p-n-dodecylphenyl, p-(2-ethyl-n-hexyl)phenyl, and the like; nitro substituted aryl radicals such as p-nitrophenyl, 2-nitronaphthyl, and the like.

Illustrative of suitable amines where $R_5$ is a monovalent radical and $R_6$ is hydrogen or a monovalent radical are methylamine, ethylamine, n-butylamine, n-octylamine, dimethylamine, diethylamine, ethyl-n-propylamine, di-n-butylamine, allylamine, cyclohexylamine, cyclopentylamine, ethoxyethylamine, 2-bromo-n-propylamine, 3-ethoxy-2-ethyl-n-hexylamine, 2-hydroxyethylamine, 2-hydroxypropylamine, 2-amino-1-butanol, 3-(N,N-di-n-butylamino)propylamine, 2-phenylethylamine, 1-phenyl-n-butylamine, aniline, m-toluidine, 2,3-xylidine, mesidine, 1-naphthylamine, N-methylaniline, 4-(N,N-diethylamino)aniline, 4-chloroaniline, 2-chloro-1-naphthylamine. 4-methoxyaniline, 4-ethoxyaniline, 4-hydroxyaniline, 4-nitroaniline, N-propylallylamine, N-phenylbenzylamine, N - cyclohexylheptylamine, 3-(aminomethyl)pyridine, 1 - naphthalenemethylamine, 2 - pyrenamine, and the like. Illustrative of suitable amines where $R_5$ and $R_6$ together form a heterocyclic ring are pyrrole, 2-methylpyrrole, 3-ethylpyrrole, and the like.

Polyolefin wax-alkyl phosphite adducts can be reacted with an amine either in solution or in the melt at temperatures of from about 150° to about 300° C. for a period of time to react at least 25%, preferably 50%, of the wax phosphonate ester groups with the amine. Generally about a stoichiometric amount of amine is employed but readily emulsifiable products can be obtained using less than stoichiometric amounts. In calculating the stoichiometry, one phosphonate ester group is presumed to react with one amino hydrogen atom. It is preferred to conduct the reaction in the absence of oxygen to secure a white product.

From the foregoing it shold be evident that emulsifiable polyolefin wax adducts useful in this invention fall into the following groups: (1) adducts of polyolefin waxes and carboxylic acids of the class described herein; (2) adducts of polyolefin waxes and an alkyl phosphite; (3) polyolefin waxalkyl phosphite adducts having at least about 25 percent of the oxyalkyl groups attached to phosphorus atoms converted to hydroxyl groups and (4) amine modified polyolefin wax-alkyl phosphite adducts.

In preparing the pest control spray compositions of this invention, an aqueous emulsion of a polyolefin wax adduct of the character described herein is preferably prepared separately for addition to the pest control dispersion. However, in the case of the so-called "emulsifiable concentrates," i.e. pest control agents dissolved in an organic solvent such as xylene and containing emulsifying agents, the wax adduct and the emulsifiable concentrate may be simultaneously dispersed in water as described hereinafter.

The aqueous dispersion of the emulsifiable polyolefin wax adduct may be prepared in any suitable manner which insures adequate dispersion, e.g. by using anionic, cationic or non-ionic emulsifying agents. It may be, and preferably is, considerably more concentrated than required in the finished pesticide composition, and this concentration may vary as convenience dictates.

In general, the dispersion may be prepared by first melting the wax adduct together with a higher fatty acid, for example a $C_{12}$ to $C_{20}$ saturated aliphatic acid, then, with the temperature between about 120° C. and about 130° C., slowly adding a volatile amine such as morpholine, methoxy propyl amine, 2-amino-2-methyl-1-propanol or the like. The hot mixture of wax adduct and emulsifying agent is then added gradually with vigorous agitation, to water which has been heated to just below boiling (e.g. 95–99° C.), preferably in such a manner that the hot wax adduct stream spirals down the vortex formed by the agitation, and becomes emulsified as it blends into the water. The emulsion may then be cooled, and remains stable after cooling.

A suitable formula for the emulsified polyolefin wax adduct is given below

|  | Parts | Percent |
|---|---|---|
| Polyolefin wax adduct | 30 | 16.7 |
| Fatty acid | 6 | 3.3 |
| Volatile amine | 6 | 3.3 |
| Water | 138 | 76.7 |
|  | 180 | 100.0 |

Water content may be varied as desired. However, at least about 2 parts of water per part of wax adduct are required to form a satisfactory emulsion concentrate. Such concentrates may be diluted with additional water to any desired degree of dilution.

About equal parts of fatty acid and volatile amine should be used as emulsifier and the ratio of combined emulsifier to wax adduct is preferably maintained between about 0.3:1 and about 0.5:1, by weight.

The pest control composition to be incorporated with the wax emulsion, either in the form of a dispersible dust, i.e. a so-called "wettable spray powder," or in the form of a concentrated solution of the toxicant in a solvent and emulsifying agent, i.e. and "emulsifiable concentrate" may be separately formed into an aqueous dispersion in the usual way, as by the addition of water, and the desired quantity of the wax adduct emulsion may be added thereto.

If the pest control composition is in the form of an "emulsifiable concentrate" the wax adduct and the emulsifiable concentrate may be dispersed in water simultaneously, for example by heating the emulsifiable concentrate and mixing it with molten wax adduct, and then blending the wax-adduct emulsifiable concentrate mixture with water.

Relatively small quantities of polyolefin wax adduct are effective in the aqueous pest control dispersions of this invention. Quantities as low as about 0.1 lb. per 100 gallons of dispersion provide enhanced effectiveness and sticking properties to the pest control composition. In general it is preferred to use between about 0.1 lb. and about 1.0 lb. of wax adduct per 100 gallons of aqueous dispersion.

Quantities of emulsifying agents required will depend somewhat upon the agent used. In the case of the amine-fatty acid emulsifiers, a satisfactory quantity is between about 30% and about 50% based on the weight of the wax adduct.

The following specific examples further illustrate this invention. Parts are by weight except as otherwise noted.

In the examples, the following emulsifiable polyolefin wax adducts were employed:

A. An adduct of polyethylene wax and diethyl hydrogen phosphite prepared by reacting diethyl hydrogen phosphite and polyethylene wax having a molecular weight of 2697, a density of 0.88, and containing 0.055% internal double bonds, 0.084% vinyl double bonds and 0.298% vinylidene double bonds in chlorobenzene in the presence of ditertiary butyl peroxide. The adduct showed no double bond absorptions in the infra red but did show characteristic phosphonate ester absorptions. The adduct had a melt viscosity of 1580 cps. at 140° C.

B. An adduct of polyethylene wax and maleic anhydride prepared by reacting maleic anhydride and polyethylene wax having a molecular weight of 2500, a density of 0.88, an average of 0.64 double bonds per polymer molecule of which 0.84% were vinyl, 0.055 were internal and 0.292 were vinylidene. The adduct contained an average of 2.2% succinic acid as determined by infra red, and had a melt viscosity of 9000 cps. at 140° C.

C. An amine modified adduct of polyethylene wax and diethyl hydrogen phosphite prepared by reacting diethyl hydrogen phosphite and polyethylene wax having a molecular weight of 2697 and a density of 0.88 in chlorobenzene in the presence of ditertiary butyl peroxide. Thereafter the adduct was reacted with monoethanolamine. The infra red spectra of the amine modified adduct showed a disappearance of double bond absorptions and absorptions at 8.00$\mu$, 9.55$\mu$ and 10.03$\mu$.

D. An adduct of polyethylene wax and maleic anhydride prepared by reacting maleic anhydride and polyethylene wax having a molecular weight of 2500, a density of 0.97 and containing an average of one double bond per polymer molecule of the internal and vinyl types. Infra red spectra of the adduct showed that it contained 4% succinic acid. The melt viscosity of the adduct was 600 cps. at 140° C.

E. An adduct of polyethylene wax and thioglycolic acid prepared by reacting thioglycolic acid and polyethylene wax having a molecular weight of 1647, a density of 0.86 and containing an average of 0.95 double bond per polymer molecule of the vinyl, internal and vinylidene types. Analysis of the adduct showed that it contained 5.21% thioglycolic acid.

EMULSIFICATION PROCEDURE

A 30 percent solids emulsion of adduct A and 25 percent solids emulsions of adducts B, C and D, were prepared by combining 100 g. of each adduct with 20 g. morpholine, 20 g. oleic acid and 300 g. water in a heated pressure vessel under 85 p.s.i. steam at 150° C. with agitation. Adduct E was employed in the pest control compositions directly.

For control purposes, the following agents were also tested.

AA. An emulsified copolymer of methyl vinyl ether and maleic anhydride sold under the name Gantrez AN–119.

BB. An emulsified copolymer of methyl vinyl ether and maleic anhydride sold under the name Gantrez AN–139.

CC. An emulsified copolymer of methyl vinyl ether and maleic anhydride sold under the name Gantrez AN–169.

DD. A 20 percent solids emulsion of ethylene-acrylic acid-sodium acrylate terpolymer.

EE. A refined, water soluble carrageenan in the form of a free-flowing powder containing 2.5 percent mono and diglyceride.

FF. A polybutene having an average molecular weight of 889 and sold under the name Indopol H–100.

GG. An emulsifiable polyethylene sold under the trademark Pylac by the General Chemical Division of Allied Chemical and Dye Corporation.

Aqueous pest control compositions were prepared from the above emulsions and the following pest control agents.

X. An air milled wettable powder comprising 80.8 percent by weight of 1-naphthyl-N-methyl carbamate, the balance being surfactants and inert ingredients, and sold under the name Sevin sprayable 80.

Y. O,O-diethyl-O - para - nitrophenylphosphorothioate solid under the name Parathion 8E.

*Examples 1–16*

The pest control compositions were tested to determine the residual life of the pest control agent after exposure to rainfall. A Beltsville apparatus was used to apply the compositions at a volume equivalent to 10 gallons per acre. A 8001E nozzle set 22 inches above the plant sprayed the compositions at 30 p.s.i. with a moving belt moving at 1 mile per hour. The residues were allowed to dry and then the plants were placed under a greenhouse rain machine which applied water at a rate of 1 inch per 20 minutes. After drying, the leaves of the plants were exposed to armyworm larvae in Petri dishes.

Mortality (percent kill) was recorded 72 hours later. Results are summarized below:

| Example No. | Type Emulsion | Concentration, pound/acre of active ingredient | Concentration, pounds/acre of Pest Control Agent X | Percent Kill of Armyworm | | |
|---|---|---|---|---|---|---|
| | | | | No Rain | 0.25" Rain | 0.5" Rain |
| 1 | A | 0.5 | 0.5 | 100 | 100 | |
| 2 | B | 0.5 | 0.5 | 100 | 100 | |
| 3 | D | 0.5 | 0.5 | 100 | 70 | |
| 4 | E | 0.5 | 0.5 | 100 | 80 | |
| 5[a] | A | 0.5 | 0.5 | 100 | 90 | |
| 6[b] | A | 0.5 | 0.5 | 100 | 100 | |
| 7 | C | 0.5 | 0.5 | 100 | 90 | 40 |
| 8 | A | 0.5 | 0.5 | 100 | | 90 |
| 9 | B | 0.5 | 0.5 | 100 | | 60 |
| 10 | B | 0.5 | 0.5 | 100 | 100 | 90 |
| 11[c] | A | 1.0 | 0.5 | 100 | 100 | |
| 12[d] | A | 2.0 | 0.5 | 100 | 90 | |
| 13[e] | A | 3.0 | 0.5 | 100 | 100 | |
| 14[f] | A | 0.25 | 0.5 | 100 | 90 | |
| 15[e] | A | 1.5 | 0.5 | 90 | 90 | |
| 16[e] | A | 0.75 | 0.5 | 100 | 40 | |
| Controls: | | | | | | |
| I | None | 0 | 0.5 | 100 | 0 | 0 |
| II | EE | 0.1 | 0.5 | 100 | 0 | 0 |
| III | FF | 0.5 | 0.5 | 100 | 0 | 0 |
| IV | AA | 0.5 | 0.5 | 100 | 0 | 0 |
| V | BB | 0.5 | 0.5 | 100 | 0 | 0 |
| VI | CC | 0.5 | 0.5 | 100 | 0 | 0 |
| VII | DD | 0.5 | 0.5 | 100 | 30 | 0 |
| VIII | GG | (pt.) 1 | 0.5 | 100 | 0 | 0 |
| IX | GG | (pt.) 0.5 | 0.5 | 100 | 10 | 0 |

[a] Tested on cotton.
[b] Tested on bean.
[c] Applied at 20 gal./acre using 8001E nozzle 12 inches above plant moving at 1 m.p.h. with 30 p.s.i.
[d] Applied at 40 gal./acre using 8002E nozzle 22 inches above plant moving at 1 m.p.h. with 30 p.s.i.
[e] Applied at 60 gal./acre using 6503 nozzle 22 inches above plant moving at 1 m.p.h. with 30 p.s.i.
[f] Applied at 10 gal./acre using 8001E nozzle 22 inches above plant moving at 1 m.p.h. with 30 p.s.i.

These examples clearly demonstrate that the wax adducts of this invention impart a prolonged effect to pest control agents under rainfall conditions whereas the pest control agent is completely washed away by the same rainfall (control I). Controls II–IX demonstrate that other agents have little or no effect on imparting a prolonged life to pest control agents under rainfall conditions.

*Examples 17–18*

The procedure of Examples 1–16 were employed to test a pest control composition of wax adduct emulsion A and pest control agent Y. Results are summarized below:

| Example No. | Concentration of Emulsion A, pounds/acre | Concentration of Pest Control Agent X, pounds/acre | Percent Kill of 2-spotted mite | | |
|---|---|---|---|---|---|
| | | | No Rain | 0.25" Rain | 0.5" Rain |
| 17 | 0.5 | 0.25 | 93 | 81 | 77 |
| 18 | 0.5 | 0.125 | 87 | 78 | 62 |
| Controls: | | | | | |
| X | None | 0.25 | 70 | 41 | 41 |
| XI | None | 0.125 | 73 | 46 | 35 |

These examples again demonstrate that wax adducts of this invention impart a prolonged effect to pest control agents under rainfall conditions.

What is claimed is:

1. An aqueous pest control dispersion comprising water, emulsifying agents, a pest control agent and an amount sufficient to provide enhanced sticking properties of an aqueous dispersion of an emulsifiable adduct of a polyolefin wax having an average of at least about one-half of an olefinic double bond per polymer molecule and a molecular weight of about 1000 to about 5000 and an organic compound capable of entering into an addition reaction with an olefinic double bond selected from the group consisting of carboxylic acids selected from the group consisting of α-unsaturated monocarboxylic acids, α-unsaturated dicarboxylic acids, mercapto carboxylic acids, and anhydrides and esters of the foregoing acids and alkyl phosphites having at least one hydrogen atom capable of entering into an addition reaction with an olefinic double bond, at least about 25 percent of said double bonds being adducted with said organic compound.

2. An aqueous pest control dispersion comprising water, emulsifying agents, a pest control agent and an amount sufficient to provide enhanced sticking properties of an aqueous dispersion of an emulsifiable polyolefin wax adduct selected from the group consisting of (1) an adduct of a polyolefin wax having an average of at least about one-half of an olefinic double bond per polymer molecule and a molecular weight of about 1000 to about 5000 and a carboxylic acid selected from the group consisting of α-unsaturated monocarboxylic acids, α-unsaturated dicarboxylic acids, mercapto carboxylic acids, and anhydrides and esters of the foregoing acids, at least about 25 percent of said double bonds being adducted with said carboxylic acid, (2) an adduct of said polyolefin wax of an alkyl phosphite having at least one hydrogen atom capable of entering into an addition reaction with an olefinic double bond, at least about 25 percent of said double bonds being adducted with said alkyl phosphite, (3) an adduct of said polyolefin wax and said alkyl phosphite wherein at least about 25 percent of the oxyalkyl groups attached to phosphorus atoms are converted to hydroxyl groups, and (4) an adduct of said polyolefin wax and said alkyl phosphite containing phosphonate ester groups wherein at least about 25 percent of said phosphonate ester groups are reacted with an amine having at least one reactive amino hydrogen atom.

3. Composition of claim 2 wherein said polyolefin wax is polyethylene wax.

4. Composition of claim 2 wherein said polyolefin wax adduct is present in an amount of from about 0.1 to 1 pound per 100 gallons of said pest control dispersion.

5. Compositions of claim 2 wherein said alkyl phosphite has the formula

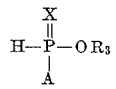

wherein X represents an atom of the group consisting of oxygen and sulfur, $R_3$ is an alkyl group having from 1 to 16 carbon atoms inclusive, and A is selected from the group consisting of hydrogen and $-OR_4$ wherein $R_4$ is an alkyl group having from 1 to 16 carbon atoms.

6. An aqueous pest control dispersion comprising water, emulsifying agents, a pest control agent and an amount sufficient to provide enhanced sticking properties of an aqueous dispersion of an emulsifiable adduct of a polyolefin wax having an average of at least about 1 olefinic double bond per polymer molecule of a molecular weight of about 1000 to about 5000 and a carboxylic acid selected from the group consisting of α-unsaturated monocarboxylic acids, α-unsaturated dicarboxylic acids, mercapto carboxylic acids and anhydrides and esters of the foregoing acids, at least about 50 percent of said double bonds being adducted with said carboxylic acid.

7. Composition of claim 6 wherein said carboxylic acid is maleic anhydride.

8. Compositions of claim 7 wherein said adduct is present in an amount of from about 0.1 to about 1 pound per 100 gallons of said pest control dispersion.

9. An aqueous pest control dispersion comprising water, emulsifying agents, a pest control agent and an amount sufficient to provide enhanced sticking properties of an aqueous dispersion of an emulsifiable adduct of a polyolefin wax having an average of at least about one olefinic double bond per polymer molecule and a molecular weight of about 1000 to about 5000 and an alkyl phosphite having at least one hydrogen atom capable of entering into an addition reaction with an olefinic double bond, at least about 50 percent of said double bonds being adducted with said alkyl phosphite.

10. Composition of claim 9 wherein said alkyl phosphite has the formula

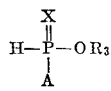

wherein X represents an atom of the group consisting of oxygen and sulfur, $R_3$ is an alkyl group having from 1 to 16 carbon atoms inclusive, and A is selected from the group consisting of hydrogen and —$OR_4$ wherein $R_4$ is an alkyl group having from 1 to 16 carbon atoms.

11. Compositions of claim 9 wherein said alkyl phosphite has the formula

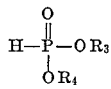

wherein $R_3$ and $R_4$ each are alkyl groups having from 1 to 16 carbon atoms inclusive.

12. Composition of claim 9 wherein said alkyl phosphite is diethyl hydrogen phosphite.

13. Composition of claim 9 wherein said adduct is present in an amount of from about 0.1 to about 1 pound per 100 gallons of said pest control dispersion.

14. An aqueous pest control dispersion comprising water, emulsifying agents, a pest control agent, and an amount sufficient to provide enhanced sticking properties of an aqueous dispersion of an emulsifiable adduct of a polyolefin wax having an average of at least about one olefinic double bond per polymer molecule and a molecular weight of about 1000 to about 5000 and an alkyl phosphite having at least one hydrogen atom capable of entering into an addition reaction with an olefinic double bond wherein at least about 50 percent of said olefinic double bonds are adducted with said alkyl phosphite and wherein at least about 50 percent of the oxyalkyl groups attached to phosphorus atoms are converted to hydroxyl groups.

15. Composition of claim 14 wherein said alkyl phosphite has the formula

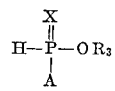

wherein X represents an atom of the group consisting of oxygen and sulfur, $R_3$ is an alkyl group having from 1 to 16 carbon atoms inclusive, and A is selected from the group consisting of hydrogen and —$OR_4$ wherein $R_4$ is an alkyl group having from 1 to 16 carbon atoms.

16. Composition of claim 14 wherein said adduct is present in an amount of from about 0.1 to about 1 pound per 100 gallons of said pest control dispersion.

17. An aqueous pest control dispersion comprising water, emulsifying agents, a pest control agent and an amount sufficient to provide enhanced sticking properties of an aqueous dispersion of an emulsifiable adduct of a polyolefin wax having an average of at least one olefinic double bond per polymer molecule and a molecular weight of about 1000 to about 5000 and an alkyl phosphite having at least one hydrogen atom capable of entering into an addition reaction with an olefinic double bond wherein at least about 50 percent of said olefinic double bonds are reactive with said alkyl phosphite thereby forming said adduct containing phosphonate ester groups, at least about 50 percent of said phosphonate ester groups being reacted with an amine having at least one reactive amino hydrogen atom.

18. Composition of claim 17 wherein said alkyl phosphite has the formula

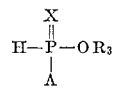

wherein X represents an atom of the group consisting of oxygen and sulfur, $R_3$ is an alkyl group having from 1 to 16 carbon atoms inclusive, and A is selected from the group consisting of hydrogen and —$OR_4$ wherein $R_4$ is an alkyl group having from 1 to 16 carbon atoms.

19. Composition of claim 17 wherein said adduct is present in an amount of from about 0.1 to about 1 pound per 100 gallons of said pest control dispersion.

20. Composition of claim 17 wherein said amine has the formula

$$R_5NHR_6$$

wherein $R_5$ represents a monovalent organic radical having from 1 to 12 carbon atoms, $R_6$ represents a member of the group consisting of hydrogen and a monovalent organic radical having from 1 to 12 carbon atoms, and $R_5$ and $R_6$, when interconnected, represents a heterocyclic ring.

21. An aqueous pest control dispersion comprising a mixture of a major amount of an aqueous dispersion of a pest control containing wettable spray powder and a minor amount of an aqueous dispersion of an emulsifiable polyolefin wax adduct selected from the group consisting of (1) an adduct of a polyolefin wax having an average of at least about one-half of an olefinic double bond per polymer molecule and a molecular weight of about 1000 to about 5000 and a carboxylic acid selected from the group consisting of α-unsaturated monocarboxylic acids, α-unsaturated dicarboxylic acids, mercapto carboxylic acids, and anhydrides and esters of the foregoing acids, at least about 25 percent of said double bonds being adducted with said carboxylic acid, (2) an adduct of said polyolefin wax of an alkyl phosphite having at least one hydrogen atom capable of entering into an addition reaction with an olefinic double bond, at least about 25 percent of said double bonds being adducted with said alkyl phosphite, (3) an adduct of said polyolefin wax and said said alkyl phosphite wherein at least about 25 percent of the oxyalkyl groups attached to phosphorus atoms are converted to hydroxyl groups, and (4) an adduct of said polyolefin wax and said alkyl phosphite containing phosphonate ester groups wherein at least about 25 percent of said phosphonate ester groups are reacted with an amine having at least one reactive amino hydrogen atom.

22. Composition of claim 21 wherein said polyolefin wax is polyethylene wax.

References Cited by the Examiner

FOREIGN PATENTS 650,850  10/1962  Canada.

JULIAN S. LEVITT, *Primary Examiner.*

STANLEY J. FRIEDMAN, *Assistant Examiner.*